United States Patent [19]

Wang et al.

[11] Patent Number: 5,144,557

[45] Date of Patent: Sep. 1, 1992

[54] METHOD AND SYSTEM FOR DOCUMENT DISTRIBUTION BY REFERENCE TO A FIRST GROUP AND PARTICULAR DOCUMENT TO A SECOND GROUP OF USER IN A DATA PROCESSING SYSTEM

[75] Inventors: Diana S. Wang, Trophy Club; Marvin L. Williams, Lewisville, both of Tex.

[73] Assignee: International Business Machines Corporation, Armonk, N.Y.

[21] Appl. No.: 566,734

[22] Filed: Aug. 13, 1990

[51] Int. Cl.⁵ .................. G06F 15/38; G06F 15/40
[52] U.S. Cl. .................................. 364/419; 395/600
[58] Field of Search ............... 364/419, 200, 900, 518, 364/408, 403, 284.3, 241.7; 395/600, 145, 155, 161, 600, 325

[56] References Cited

U.S. PATENT DOCUMENTS

| | | | |
|---|---|---|---|
| 4,503,499 | 3/1985 | Mason et al. | 364/200 |
| 4,805,134 | 2/1989 | Calo et al. | 364/900 |
| 4,807,154 | 2/1989 | Scully et al. | 364/518 |
| 4,815,030 | 3/1989 | Cross et al. | 364/900 |
| 4,817,018 | 3/1989 | Cree et al. | 364/518 |
| 4,899,299 | 2/1990 | MacPhail | 364/518 |
| 4,945,475 | 7/1990 | Bruffey et al. | 364/200 |
| 5,014,192 | 5/1991 | Mansfield et al. | 395/600 |
| 5,046,002 | 9/1991 | Takashi et al. | 395/600 |
| 5,046,405 | 4/1991 | Nishikodo et al. | 395/600 |
| 5,058,162 | 10/1991 | Santon et al. | 395/600 |
| 5,089,956 | 2/1992 | MacPhail | 395/600 |
| 5,101,345 | 3/1992 | MacPhoul | 395/600 |

Primary Examiner—Gail O. Hayes
Assistant Examiner—Xuong Chung
Attorney, Agent, or Firm—Andrew J. Dillon

[57] ABSTRACT

A method is disclosed for efficiently transferring documents stored within a data processing system. An identifying reference is created and associated with a particular document within the data processing system, the identifying reference including identifying information and at least a location wherein the document is stored. Thereafter, the identifying reference may be selectively transmitted to selected users. In one embodiment of the present invention, an originator of a document may identify a first group of users to receive only the identifying reference and a second group of users to receive the document. Upon the identification of the first and second groups of users, the identifying reference is automatically transmitted to the first group of users while the document is automatically transmitted to the second group of users. The originator of an identifying reference may also assign different levels of access authority to the selected users. The access authority levels are preferably transmitted with the identifying reference. In another embodiment of the present invention, the originator of an identifying reference may also request notification when the intended recipient user accesses a document designated by the identifying reference.

12 Claims, 3 Drawing Sheets

METHOD AND SYSTEM FOR DOCUMENT DISTRIBUTION BY REFERENCE TO A FIRST GROUP AND PARTICULAR DOCUMENT TO A SECOND GROUP OF USER IN A DATA PROCESSING SYSTEM

BACKGROUND OF THE INVENTION

1. Field of the Invention

The present invention relates in general to the field of data processing systems and in particular to the field of transferring documents among users within a data processing system. Still more particularly, the present invention relates to a method for creating an identifying reference for a particular document and transmitting only that identifying reference to selected users, wherein transmission efficiency is improved.

2. Description of the Related Art

It is well known in existing data processing systems to permit the transfer of documents among many users within the system. Further, a user may simultaneously transmit a single document to multiple users within a data processing system. While such systems operate efficiently and rapidly, a degradation in system efficiency occurs when a user desires to transmit a large document to many users simultaneously. This problem creates an additional difficulty when a substantial number of the intended recipients do not desire to receive the document or wish to subsequently access the document when a need arises. The system efficiency is greatly diminished in such instances where large documents comprising many pages of information are simultaneously transmitted to multiple users, one or more of whom do not desire to receive the document.

It should therefore be apparent that a need exists for a method whereby a large document may be created and stored for possible access by any intended recipient within the data processing network and wherein the existence of the document in question and the method for accessing that document may be distributed by an identifying reference to the document which includes, at least, the location wherein the document is stored. In this manner a large document may be created and efficiently distributed to a large number of intended recipients by notifying each intended recipient of the existence of the document and the location whereby the document may be obtained. Thereafter, only those intended recipients who desire to access the document will transmit a copy of the document from the stored location to each intended recipients' location. In this manner data processing system network efficiency is greatly enhanced.

It is also well known in the data processing system art for an originator of a document to request a confirmation that the document has been received by an intended recipient. As those skilled in the art will appreciate upon reference to the foregoing this system will not permit an originator of a document to confirm that an intended recipient of the document has received the document if only an identifying reference has been transmitted. Therefore, it should be apparent that a need exists whereby the originator of a document which is stored and transmitted by means of an identifying reference may confirm that an intended recipient of that document has accessed and copied the document at some time in the future.

It should therefore be apparent that a need exists for a method whereby large documents may be rapidly and efficiently transmitted throughout a data processing network to only those intended recipients who desire a copy of the document, while making the document itself available to an entire list of intended recipients.

Therefore, it should be obvious that a need exists for a method whereby an identifying reference which includes the location of a document is transmitted to users instead of the entire document, thereby, transferring the document to only those users wanting a copy of it.

SUMMARY OF THE INVENTION

It is therefore one object of the present invention to provide an improved data processing system.

It is another object of the present invention to provide an improved method for efficiently transferring documents within a data processing system.

It is yet another object of the present invention to provide an improved method for efficiently transferring documents within a data processing system wherein an identifying reference which includes a location for a document is transmitted instead of transmitting the entire document.

The foregoing objects are achieved as is now described. An identifying reference is created and associated with a particular document within the data processing system, the identifying reference including identifying information and at least a location wherein the document is stored. Thereafter, the identifying reference may be selectively transmitted to selected users. In one embodiment of the present invention, an originator of a document may identify a first group of users to receive only the identifying reference and a second group of users to receive the document. Upon the identification of the first and second groups of users, the identifying reference is automatically transmitted to the first group of users while the document is automatically transmitted to the second group of users. The originator of an identifying reference may also assign different levels of access authority to the selected users. The access authority levels are preferably transmitted with the identifying reference. The originator of an identifying reference may also request notification when the intended recipient user accesses a document designated by the identifying reference. This notification requirement is stored with a document and is referred to each time the document is accessed to generate a notification signal. Thereafter, upon access of the document the originator is automatically notified.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
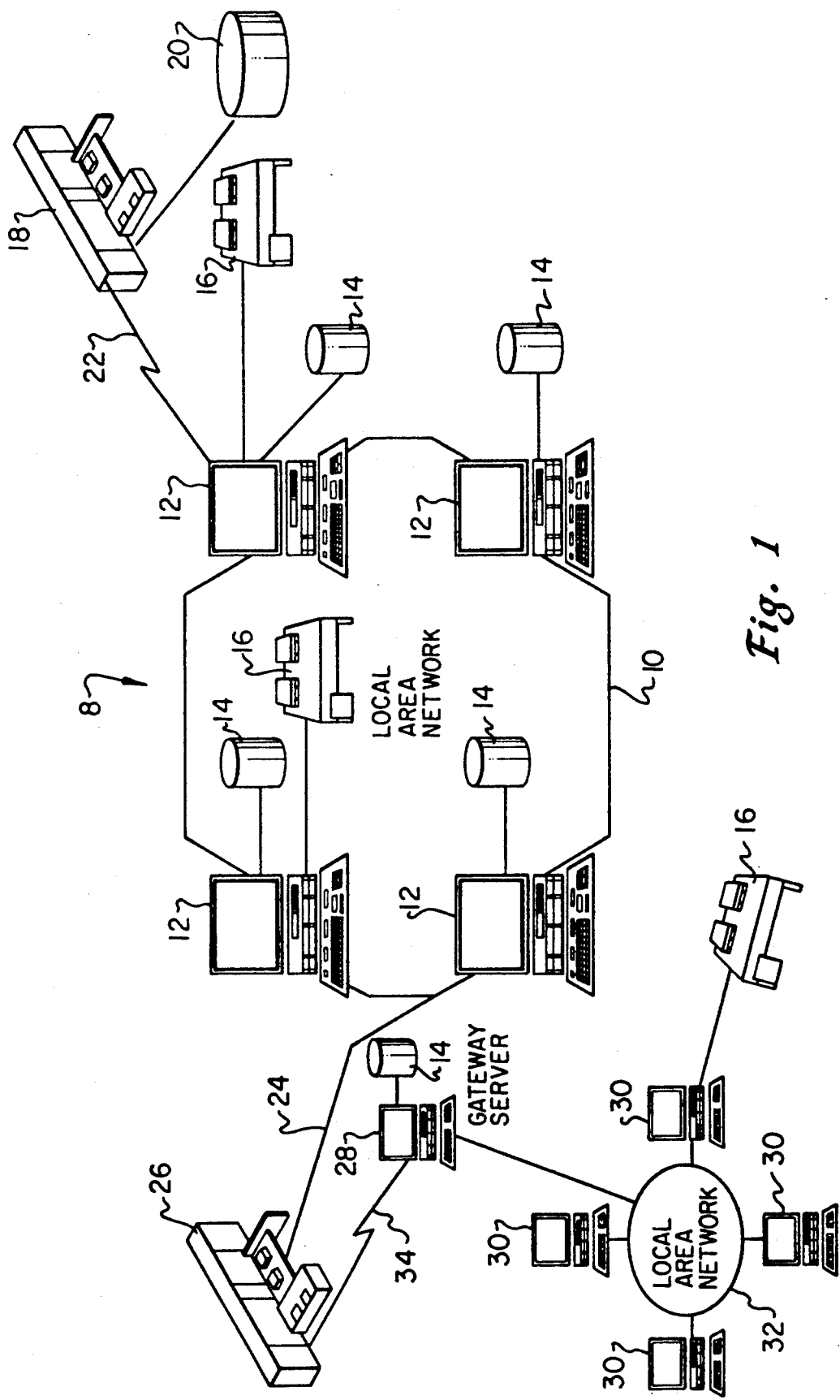
FIG. 1 is a pictorial representation of a distributed data processing system which may be utilized to implement the method of the present invention.

With reference now to the figures and in particular with reference to FIG. 1, there is depicted a pictorial representation of a data processing system s which may be utilized to implement the method of the present invention. As may be seen, data processing system s may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common is such data processing systems, each individual computer may be coupled to a storage device 14 and/or a printer/output device 16. One or more such storage devices 14 may be utilized, in accordance with the method of the present invention, to store the various data objects or documents which may be periodically accessed and processed by a user within data processing system 8, in accordance with the method of the present invention. In a manner well known in the prior art, each such data processing procedure or document may be stored within a storage device 14 which is associated with a Resource Manager or Library Service, which is responsible for maintaining and updating all resource objects associated therewith.

Still referring to FIG. 1, it may be seen that data processing network 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10 may be coupled via communications controller 27 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data processing procedures or documents may be stored within storage device 20 and controlled by mainframe computer 18, as Resource Manager or Library Service for the data processing procedures and documents thus stored. Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is desirable for users within one portion of distributed data processing network 8 to be able to create or select a document for transfer to other users within data processing network 8, since complex documents transferred to a large number of recipients may unduly burden data processing network s it would be desirable to be able to transmit an identifying reference indicating the location of the document instead of transferring the entire document.

Figure 2:
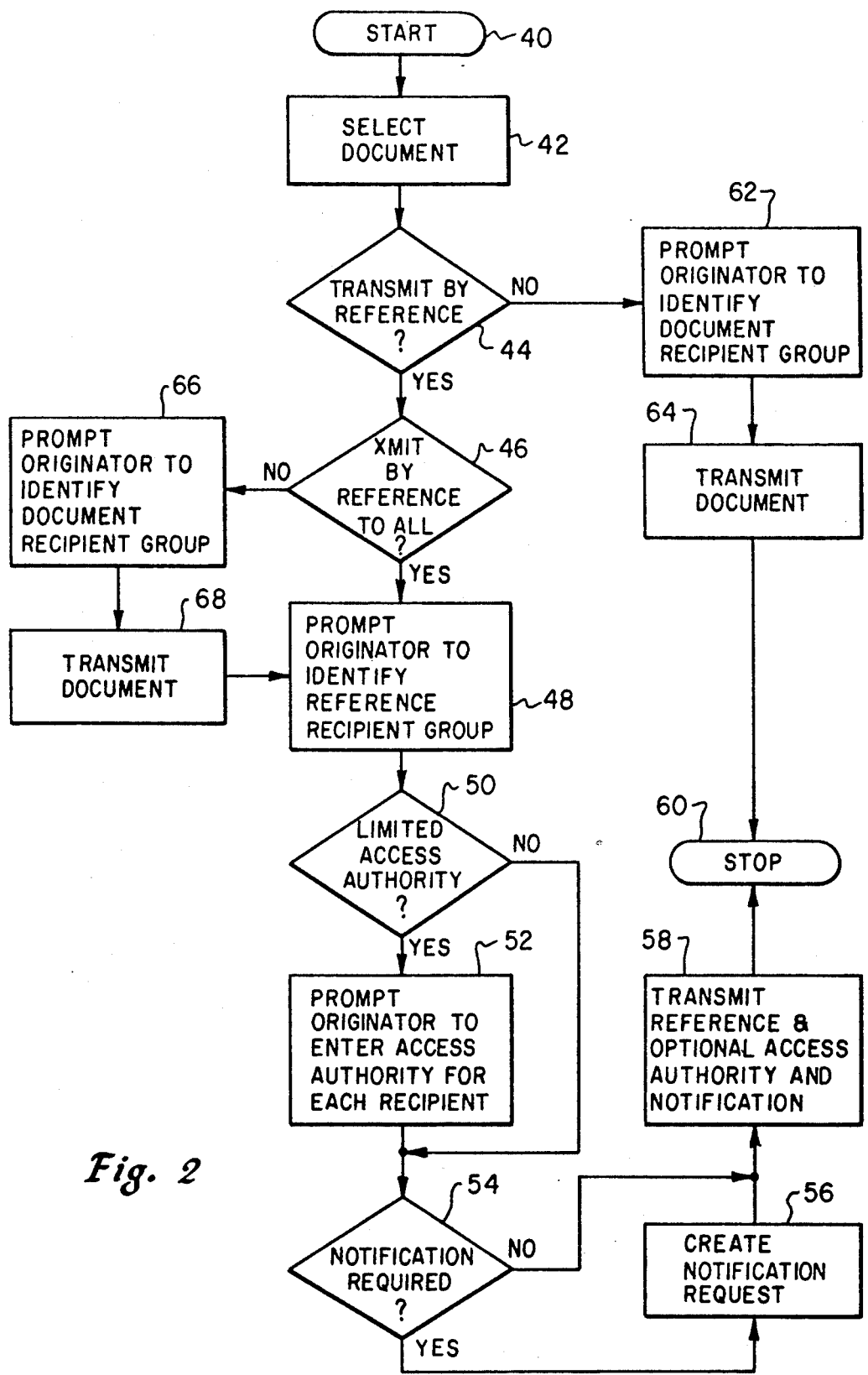
FIG. 2 is a high level flow chart depicting the transfer of an identifying reference and document in accordance with the method of the present invention.

Referring now to FIG. 2, there is illustrated a high level flow chart depicting the transfer of an identifying reference and document in accordance with the method of the present invention. The process begins at block 40 and thereafter passes to block 42 which illustrates a document selection by a user within a data processing network 8 (see FIG. 1). As utilized herein, the term document shall mean any collection of data such as a document with or without an appended message, a message only, a folder, a folder and its contents, a folder's contents only, a stapler document, or a staplee document. Next, block 44 illustrates a determination of whether or not the user in question wishes to transmit an identifying reference instead of transmitting the entire document.

In the event the user chooses not to transmit an identifying reference, the process passes to block 62 wherein the originating user is prompted to identify the intended document recipients. Thereafter, block 64 is utilized to transmit the document to the identified recipients. The process then terminates at block 60.

Referring again to block 44, if a determination is made that the originator wishes to transmit an identifying reference, the process passes to block 46 wherein a determination is made whether the originator wishes to transmit an identifying reference to all of the intended recipients. In the event the originator wishes to transmit the identifying reference to all of the intended recipients, the process passes to block 48 wherein the originating user is prompted to identify the reference recipient group.

Referring again to block 46. If a determination is made not to transmit the identifying reference to all of the intended recipients, block 66 is utilized to prompt the originating user to identify a recipient group to receive the entire document. The process then passes to block 68 wherein the transmittal of the document is illustrated. Thereafter, block 48 depicts the prompting of the originating user to identify a recipient group which will receive the identifying reference.

Once the process has passed to block 48 through either of the previously described paths, the process continues to block 50, wherein a determination is made whether or not a limited access authority is to be granted to each recipient user. As depicted herein, a different level of limited access authority may be assigned for each recipient user. If the determination depicted in block 50 indicates that the recipient user will receive a limited access authority, the process continues to block 52, which depicts the originating user being prompted to enter the access authority desired for each recipient user. Thereafter, the process passes to block 54.

Referring again to block 50, if the determination depicted therein indicates that each recipient users should receive unlimited access authority, the process passes directly to block 54.

Once the process has passed to block 54, through either of the previously described paths, block 54 illustrates a determination whether or not the originating user requires notification when any document which is identified by an identifying reference is accessed. If notification is required, the process passes to block 56 which depicts the creation and storage of the notification request. The process then passes to block 58, which illustrates the transmitting of the reference, along with any optional access authority. The process then terminates at block 60.

Referring again to block 54, if a notification is not required, the process passes directly to block 58 which depicts the transmitting of the reference, along with any optional access authority. The process again terminates at block 60.

Upon reference to the foregoing those skilled in the art will appreciate that by selecting a document and associating an identifying reference with that document in accordance with the method of the present invention a computer user may transmit the identifying reference to recipient users instead of transmitting the entire document. In this manner an originating user may select a group of users to receive only the identifying reference and a second group of users to receive the entire document. Thereafter, the originating user may also assign different levels of access authority to each recipient user and may also specify whether a notification of access of an identified document is required.

Figure 3:
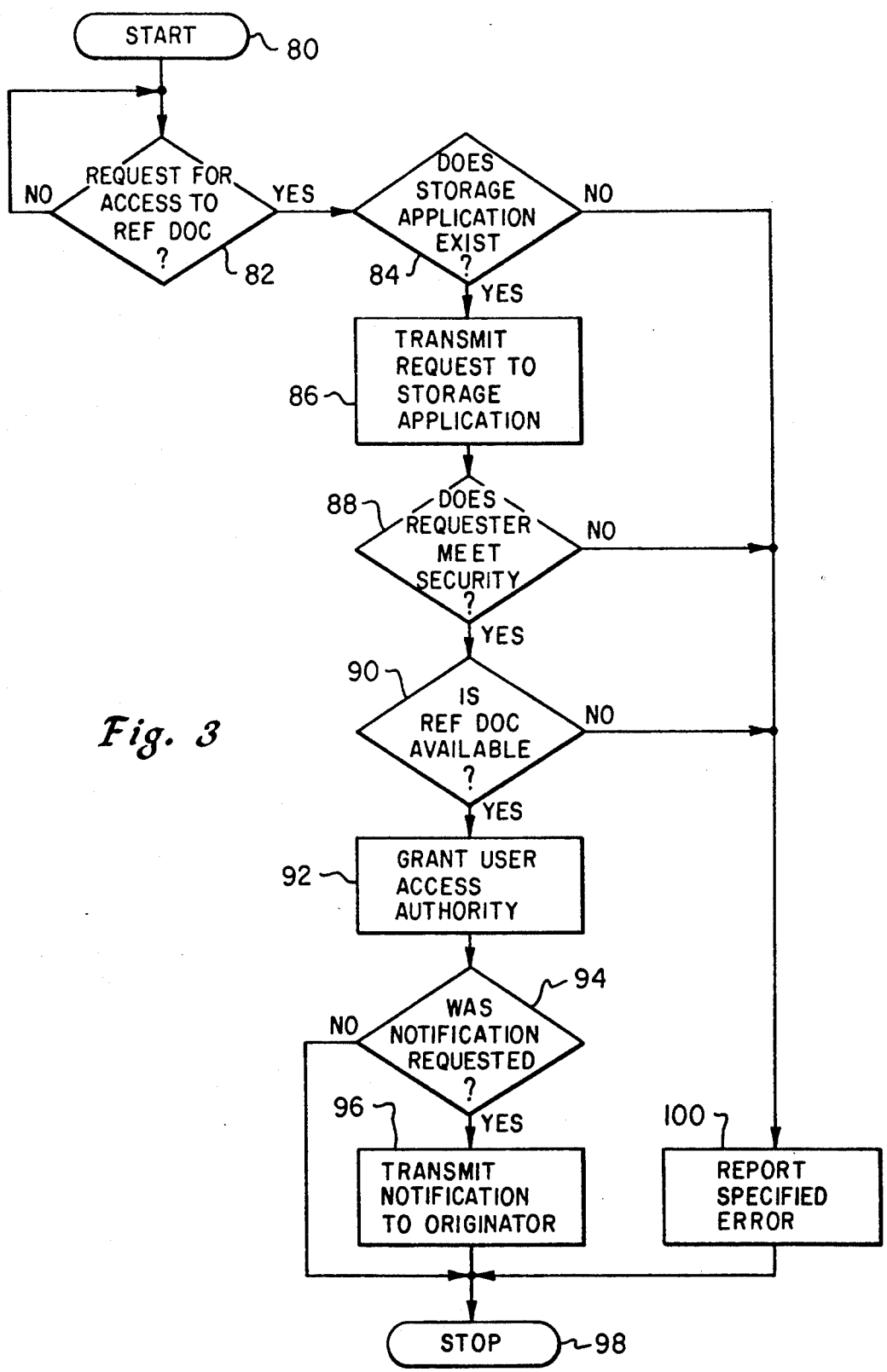
FIG. 3 is a high level flow chart depicting the receipt of an identifying reference and document in accordance with the method of the present invention.

With reference now to FIG. 3 there is depicted a high level flow chart illustrating the receipt of an identifying reference and document in accordance with the method of the present invention. The process begins at block 80 and thereafter passes to block 82 which illustrates a determination of whether a request for access to a referenced document has been made. If a request has not been made, the process repeats iteratively until such time as a request occurs.

Referring again to block 82, if a request for access to a referenced document has been made, the process passes to block 84 where a determination is illustrated as to whether or not a storage application exists. If a storage application for the referenced document does not exist, the process passes to block 100 which illustrates the reporting of a specified error. The process then terminates at block 98.

Referring again to block 84, if a storage application for the referenced document does exist, the process passes to block 86 which depicts the transmitting of a request for the referenced document to the storage application. The process then passes to block 88 which illustrates a determination whether the requester meets the required security level specified for the referenced document. If the requester does not meet the required security level, the process again passes to block 100, which illustrates the reporting of a specified error. The process again terminates at block 98.

Referring again to block 88, if the requester does meet the required security level for the specified document, the process passes to block 90 which depicts a determination of whether or not the referenced document is available. Those skilled in the art will appreciate that it is possible that the retrieved document may be deleted from the system prior to an access request by a recipient of an identifying reference. If the referenced document is no longer available, the process then passes to block 100 which illustrates the reporting of a specified error. The process again terminates at block 98.

Referring again to block 90, if the reference document is available, the process passes to block 92 which illustrates the granting of user access authority. Next, the process passes to block 94 which depicts a determination of whether or not notification was requested. In the event a notification message was not requested, the process terminates at block 98. However, in the event a notification message was requested, the process passes to block 96 which depicts transmission of a notification message to a specified user. The process again terminates at block 98.

Upon reference to the foregoing those skilled in the art will appreciate that the Applicants have disclosed a method whereby a recipient user with proper access authority and security may access a document which has been distributed by means of an identifying reference. In this manner, the present invention permits the transmitting of a notification signal, if the originating user has requested one.

While the invention has been particularly shown and described with reference to a preferred embodiment, it will be understood by those skilled in the art that various changes in form and detail may be made therein without departing from the spirit and scope of the invention.

I claim:

1. A method in a data processing system having a plurality of users enrolled therein, and a plurality of documents stored therein, for permitting the efficient access of documents within said data processing system, said method comprising the steps of:

selecting a particular document within said data processing system;

creating an identifying reference for said particular document within said data processing system, said identifying reference including at least a location within said data processing system wherein said particular document is stored;

identifying a first group of users;

identifying a second group of users; and, transmitting said identifying reference to all of said first group of users within said data processing system while transmitting said particular document to all of said second group of users within said data processing system wherein selected ones of said first group of users may elect to access said particular document in response to receipt of said identifying reference.

2. The method in a data processing system for permitting the efficient accessing of documents within said data processing system according to claim 1, wherein said step of transmitting said identifying reference to all of said first group of users while transmitting said particular document to all of said second group of users comprises the step of automatically transmitting said identifying reference to all of said first group of users in response to said identifying of said first group of users.

3. The method i a data processing system for permitting the efficient access of documents within said data processing system according to claim 1, wherein said step of transmitting said identifying reference to all of said first group of users while transmitting said particular document to all of said second group of users comprises the step of automatically transmitting said particular document to all of said second group of users in response to said identifying of said second group of users.

4. The method in a data processing system for permitting the efficient access of documents within said data processing system according to claim 1, further including the step of transmitting with said identifying reference within said data processing system an indication of access authority associated with said particular document for each of said first group of users.

5. The method in a data processing system for permitting the efficient access of documents within said data processing system according to claim 1, further including the step of transmitting a notification signal to an originator of said identifying reference in response to an access of said particular document by one of said first group of users.

6. The method in a data processing system for permitting the efficient access of documents within said data processing system according to claim 1, wherein said particular document comprises a main document with an appended message.

7. The method in a data processing system for permitting the efficient access of documents within said data processing system according to claim 1, wherein said second group of users comprises at least one library service.

8. A data processing system for permitting the efficient access of documents within said data processing system, said data processing system having a plurality of users enrolled therein, and having a plurality of documents stored therein, said data processing system comprising:

means for selecting a particular document within said data processing system;

means for creasing an identifying reference for said particular document within said data processing system, said identifying reference including at least a location within said data processing system wherein said particular document is stored;

means for identifying a first group of users;

means for identifying a second group of users; and means for transmitting said identifying reference to all of said first group of users within said data processing system while transmitting said particular document to all of said second group of users within said data processing system wherein selected ones of said first group of users may elect to access said particular document in response to receipt of said identifying reference.

9. The data processing system for permitting the efficient access of documents within said data processing system according to claim 8, wherein said means for transmitting said identifying reference to all of said first group of users while transmitting said particular document to all of said second group of users comprises means for automatically transmitting said identifying reference to all of said first group of users in response to said identifying of said first group of users.

10. The data processing system for permitting the efficient access of documents within said data processing system according to claim 1, wherein said means for transmitting said identifying reference to all of said first group of users while transmitting said particular document to all of said second group of users comprises means for automatically transmitting said particular document to all of said second group of users in response to said identifying of said second group of users.

11. The data processing system for permitting the efficient access of documents within said data processing system according to claim 8, further including means for transmitting with said identifying reference within said data processing system an indication of access authority associated with said particular document for each of said first group of users.

12. The data processing system for permitting the efficient access of documents within said data processing system according to claim 8, further including means for transmitting a notification signal to an originator of said identifying reference in response to an access of said particular document by one of said first group of users.

* * * * *